United States Patent [19]
Golisch

[11] Patent Number: 4,652,224
[45] Date of Patent: Mar. 24, 1987

[54] EXTRUSION HEAD

[75] Inventor: Hans-Joachin Golisch, Hanover, Fed. Rep. of Germany

[73] Assignee: Paul Torester Maschinenfabrik, Hanover, Fed. Rep. of Germany

[21] Appl. No.: 757,089

[22] Filed: Jul. 19, 1985

[30] Foreign Application Priority Data

Jul. 21, 1984 [DE] Fed. Rep. of Germany ....... 3427022

[51] Int. Cl.$^4$ ............................................. B29C 47/04
[52] U.S. Cl. ............................... 425/131.1; 425/133.5; 425/188; 425/462; 425/466
[58] Field of Search .................. 425/113, 131.1, 133.5, 425/185, 188, 462, 466; 264/171

[56] References Cited

U.S. PATENT DOCUMENTS 4,137,027 1/1979 Ruger ............................... 425/133.5
4,548,568 10/1985 Herbert et al. ....................... 425/188

Primary Examiner—Jay H. Woo
Assistant Examiner—Timothy W. Heitbrink
Attorney, Agent, or Firm—Robert E. Burns; Emmanuel J. Lobato; Bruce L. Adams

[57] ABSTRACT

An extrusion head for producing profiles from different compounds comprises a body having a main fixed body portion with a plane forward face and two movable body portions which are pivotally mounted on the main body portion to pivot between a closed position in which they overlie the forward face of the main body portion and an open position. A short central channel leads from a central extruder to an extrusion die mounted in front of the forward face of the main body portion while flow channels formed between the forward face of the main body portion and the movable body portions lead from two side extruders respectively to the extrusion die. The movable body portions are moved between open and closed positions by hydraulic cylinder piston units which also hold the movable body parts in closed position during the extrusion process. Hydraulically operated clamping devices on the movable body parts releasably hold the extrusion die in position.

7 Claims, 2 Drawing Figures

EXTRUSION HEAD

FIELD OF INVENTION

The invention relates to an extrusion head for producing profiles of different compounds which are pressed out by several screw extruders which are combined in a structural unit comprising at least three body portions; namely a main body portion with the extruder cylinders and two movable body portions with flow channels lying between them.

BACKGROUND OF THE INVENTION

Extrusion heads of this kind are known in various forms. They are found in such extrusion apparatus as extrude profile strips in which portions of different materials are arranged next to one another. Often, in such extrusion apparatus, the screw extruders are arranged pickaback over one another but they can also be arranged along side one another. With known extrusion installations of this kind, the extruder head consists of a part fast to the extruder which usually has in the middle a projection block at an acute angle to the extrusion direction whose edges, running at acute angles to one another, are aimed in the extrusion direction and enclose between them the flow channel. The movable parts are closed against this central projection and are locked here during extrusion by clamps which are pushed by hydraulic cylinders. For opening these movable parts, special hydraulic cylinders are provided. While with extrusion installations of this kind with two screw extruders, a central fixed projection and two hinged movable parts are provided, installations with more screw extruders are thereby expanded that, for example, between a movable body part and the fixed central body part an additional plate is arranged.

An objection of all of these extrusion installations is that the way from the tip of the extruder screw to the extrusion die is long and the flow channels are located in different division planes. With these long passages, a considerable amount of material is lost which must be removed out of the flow channels in the cleaning of the extrusion installation after the extrusion process and cannot further be used. In particular with the main extruder of an extruder installation of this kind, considerable material is lost. Of particular disadvantage is that the head through the long flow channels has a high flow resistance which results in high mass temperatures and-/or limited output.

A further disadvantage is that the opening process with the removal and two-sided opening of the clamps and the subsequent opening of the movable parts requires a considerable amount of time which results in losing production time when there is a change-over from one material combination to another material combination for the extrusion process. Special closing and locking by means of the clamps which must be swung and then actuated by hydraulic cylinders after the cleaning process, takes away a considerable amount of production time.

The known extrusion heads of this kind are also not easily produced. The high pressures working against large surfaces require a very robust construction of the main parts of the extrusion head. On the other hand, these main parts, in particular in the different separation planes, must be machined with great accuracy so that the three or more parts close tightly with one another.

SUMMARY OF THE INVENTION

The present invention eliminates these disadvantages of the prior art. It is an object of the invention to provide an extrusion head which is simpler to construct and assemble and for which far smaller forces are required in order to hold it closed in the extrusion process and which is characterized by short flow paths, in particular for the mass coming from the main extrusion cylinder.

In accordance with the invention, the separation surface between the fixed and movable body parts lies in a plane or in planes at an obtuse angle to one another and that a flow channel crosses this separation surface and at least a part of another flow channel lies in this separation surface.

An extrusion head of this kind is considerably simpler to produce than known extrusion heads. It has shorter flow paths. In particular, the flow paths for the material from the main cylinder is extraordinarily short. That leads to a limited resistance head, limited material dwell time and limited material loss when changing to another material combination. It also leads to limited forces acting on the movable parts so that these movable body parts of the extrusion head can be produced with considerably less material. It also enables holding the two movable body parts with lower forces.

It is especially advantageous when the movable body parts are swingable about two parallel axes and are attached to hydraulic actuating cylinders which remain as holding devices during the extrusion process under pressure. Then the clamps which are usually in the state of the art can be eliminated. The opening time and the closing time for the extrusion head for the required cleaning is substantially shortened.

It is especially advantageous when the entire flow channel lies in the separation pane.

It has proved advantageous when the one or more part flow canal insert is arranged between the cylinder of the main extruder and the movable body parts. This is easily interchangeable, it need not be especially fast, it gives the material emerging from the main extruder a suitable form for the extrusion.

BRIEF DESCRIPTION OF DRAWINGS

The nature of the invention is described more fully with reference to a preferred embodiment shown schematically in the accompanying drawings in which.

DESCRIPTION OF PREFERRED EMBODIMENT

Figure 1:
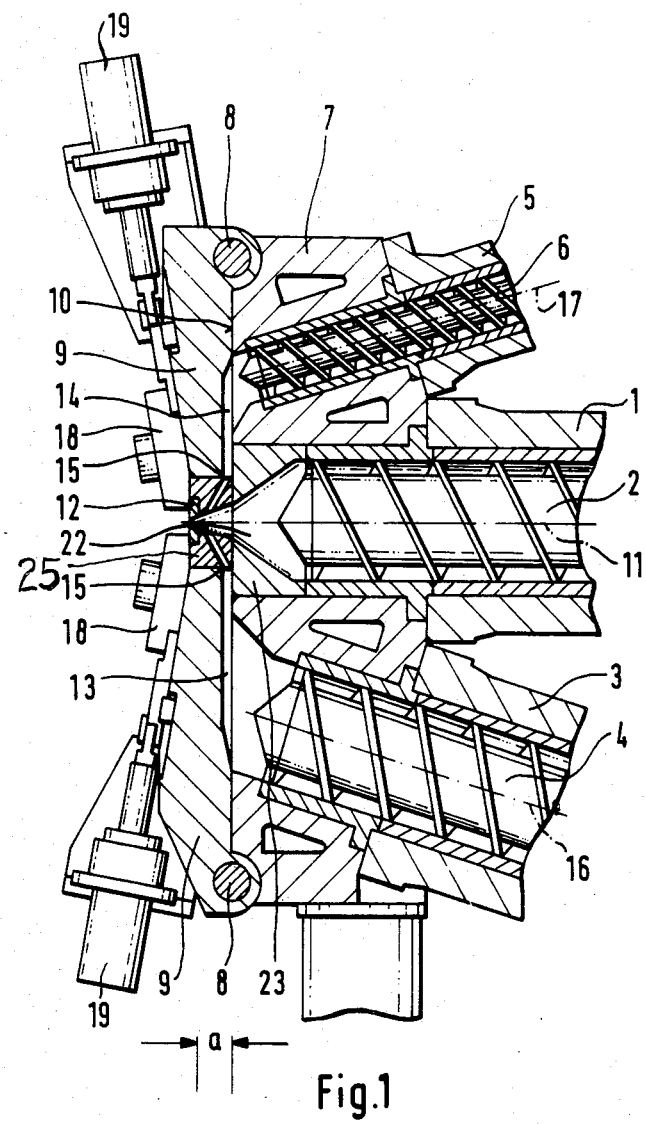
FIG. 1 is a axial section through the extrusion head and a part of the extrusion unit with three extruders.

The extrusion unit shown by way of example in the drawings comprises a main cylinder 1 with a screw 2. On both sides of the main cylinder 1, there are arranged further screw extruders having cylinders 3,5 and screws 4,6. These three screw extruders press the required material compressed in them into the extrusion head which comprises a fixed body part 7 which is fixedly joined with the three screw extruders 1 to 6. On two edges of this fixed body part 7, lying one above the other, there are hinges 8 with which the two movable body parts 9 are connected with the fixed body parts 7.

The separation surface 10 between the two movable body parts 9 and fixed body part 7 is a plane. The three body parts, 7,9 of the extrusion head are thereby very simple to manufacture. This separation surface is perpendicular to the axis 11 of the main extruder 1,2. A short distance behind the separation plane 10 (as seen from the main extruder 1,2)there is an extrusion die 12 so that the material extruded from the main extruder 1,2 has an acceptionally short pass from the tip of the screw 2 to the extrusion die 12.

The flow channels 13,14 of the two laterally arranged screw extruders 3,4 and 5,6 run directly on the separation surface 10 whereby they either lie on the separation surface so that the separation surface forms a wall of the flow channels 13,14 or whereby these flow channels lie in the separation surface. The flow channels 13,14 can either be formed directly in the main body part or also in interchangeable inserts. Shortly before reaching the zone of the flow canal of the main cylinder 1,2, the flow channels 13,14 bend at points 15 to the extrusion die 12. As the flow channels 13,14 lie at an obtuse angle of for example between 90° and 135° to the axes 16,17 of the screw extruders 3,4: 5,6, the flow path likewise here is quite short as compared with the state of the art.

The two movable body parts can be formed as small approximately flat-form parts. On the sides turned towards the screw extruders, the body parts 9 have flow canals 13,14. On the side turned away from the extruders, the parts 9 have clamping devices 18 and means for operating the clamping devices, for example, hydraulic cylinders 19 for clamping the extrusion die 12 in place.

The two body parts 9 are opened and closed by means of hydraulic cylinder-piston units 21 which are connected with the body parts by bearing trunions 20. Opposite ends of the cylinder-piston units 21 are connected with the fixed body part by bearing trunions 20a. The hydraulic cylinder-piston units 21 serve not only to open and close the movable body parts 9, but also serve to hold them in closed position during the extrusion process. Hence, no clamps or other securing means are required for this purpose.

Directly behind the cylinder 1 of the main extruder 1,2 there is a flow channel insert 23 which forms the flow channel 22 for the material extruded out of the main extruder. It will be seen that the flow channel 22 is tapered and leads into a tapered central channel 24 of an insert 25 which constitutes the holder of the extrusion die 12. It will be seen that the flow channel insert 23 is relatively short, being less than the inner diameter of the main extrusion cylinder 1. Moreover, it will be seen that the extrusion die 12 is spaced only a short distance "a" from the end of the insert 23 which lies in the separation plane between the fixed and movable body parts.

Figure 2:
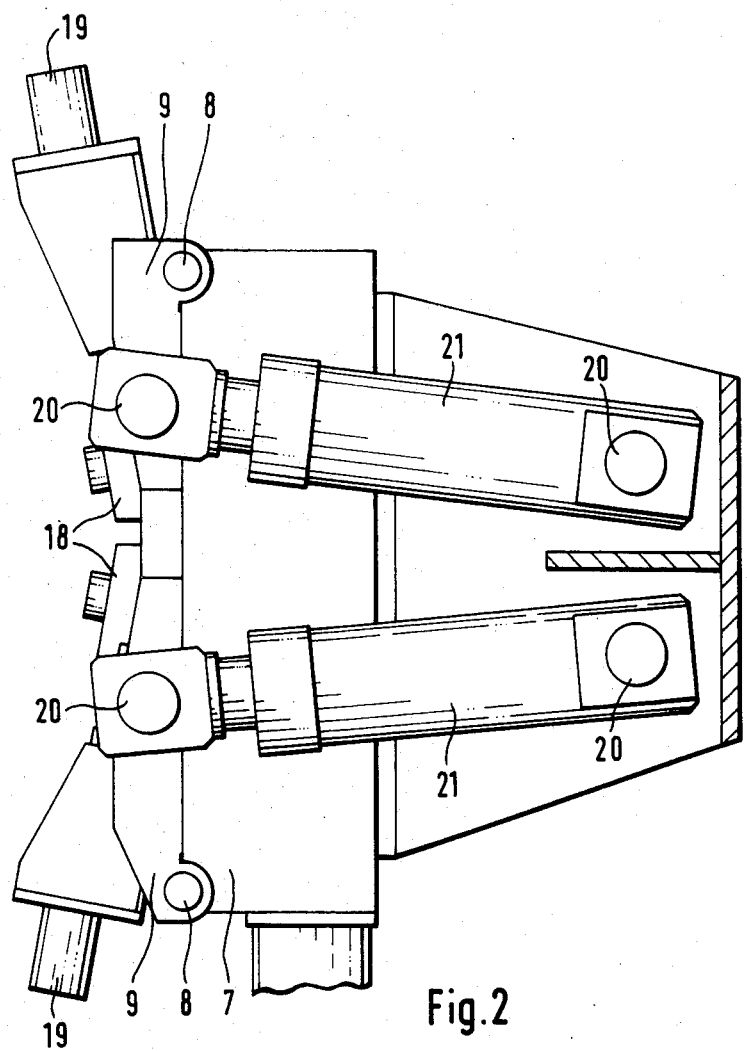
FIG. 2 is a schematic side view of the apparatus shown in FIG.1.

During the extrusion process, the movable body parts 9 are held in closed position as shown in FIGS. 1 and 2 by the hydraulic cylinder-piston units 21. The extrusion die 12 together with the die holder 25 are held in position by the clamping devices 18 operated by the hydraulic cylinders 19. Material from the main extrusion cylinder flows through the tapered flow channel 22 of the insert 23 and the flow channel 24 of the die holder 25 to the extrusion die. Material from the side extrusion cylinders 3 and 5 flows through the flow channels 13 and 14 respectively to the extrusion die.

When it is desired to change to other compounds, the movable body parts 9 are swung to open position by the hydraulic cylinder-piston units 21. The flow channels 13 and 14 can there-upon be cleaned. Also access is provided to the discharge ends of extrusion cylinders 3 and 5. Moreover, the extrusion die 12 together with the die holder 25 and the flow channel insert 23 can be removed for cleaning and, if desired, replacement. The movable body members 9 are thereupon moved to closed position by the hydraulic cylinder-piston units 21 in preparation for the next extrusion process.

What is claimed is:

1. Extrusion head for producing profiles from different compounds, said extrusion head comprising a main body portion having a forward face and two movable body portions overlying said forward face of said main body portion, three extrusion cylinders comprising a central cylinder and two side cylinders, said three extrusion cylinders having forward ends leading into said main portion, an extrusion screw in each of said extrusion cylinders, said forward face of said main body portion lying generally in a plane substantially perpendicular to the axis of said central cylinder, an extrusion die mounted on said forward face of said main body portion in line with said central cylinder and between said movable body portions, a central channel leading from the forward end of said central cylinder to said extrusion die and two side channels formed between the forward face of said main body part and said two movable body parts respectively, said two side channels leading from the forward ends of said side cylinders respectively to said extrusion die, said movable body portions being movable to open said side channels and afford access to forward ends of said side cylinders.

2. Extrusion head according to claim 1, in which said movable body portions are pivotally mounted on said main body portion so as to swing out away from said forward face of said main body portion.

3. Extrusion head according to claim 2, further comprising hydraulic cylinder piston units for swinging said movable body portions about their respective pivots and for holding said movable body portions in closed position against the forward face of said main body portion.

4. Extrusion head according to claim 1, further comprising clamping means on said movable body portions for holding said extrusion die in position.

5. Extrusion head according to claim 4, in which said clamping means is hydraulically operated.

6. Extrusion head according to claim 1, in which said central channel comprises an insert between the forward end of said central cylinder and said movable body portions.

7. Extrusion head according to claim 2, in which said pivotally mounted movable body portions have pivot axes which are parallel to one another and lie substantially in the plane of said forward face of said main body portion.

* * * * *